US008645436B2

(12) United States Patent
Nivala

(10) Patent No.: US 8,645,436 B2
(45) Date of Patent: Feb. 4, 2014

(54) METHOD, A COMPUTER SYSTEM, A COMPUTER READABLE MEDIUM AND A DOCUMENT MANAGEMENT SYSTEM FOR REPAIRING REFERENCES OF FILES

(75) Inventor: Antti Nivala, Pirkkala (FI)

(73) Assignee: M-Files Oy, Tampere (FI)

( * ) Notice: Subject to any disclaimer, the term of this patent is extended or adjusted under 35 U.S.C. 154(b) by 632 days.

(21) Appl. No.: 12/220,681

(22) Filed: Jul. 24, 2008

(65) Prior Publication Data

US 2010/0023526 A1      Jan. 28, 2010

(51) Int. Cl.
*G06F 17/30* (2006.01)
(52) U.S. Cl.
USPC .......................................... 707/821; 707/822
(58) Field of Classification Search
USPC ................................................. 707/609, 612
See application file for complete search history.

(56) References Cited

U.S. PATENT DOCUMENTS

| 5,941,944 | A  | * | 8/1999 | Messerly ...................... 709/203 |
| 6,351,741 | B1 | * | 2/2002 | Flenniken ........................... 1/1 |
| 6,449,615 | B1 |   | 9/2002 | Liu et al. |
| 6,728,712 | B1 | * | 4/2004 | Kelley et al. .................. 707/770 |
| 2002/0112135 | A1 | * | 8/2002 | Playe ............................ 711/162 |
| 2003/0004978 | A1 | * | 1/2003 | Greenbaum ................... 707/202 |
| 2004/0088305 | A1 |   | 5/2004 | Kintzley et al. |
| 2004/0230599 | A1 |   | 11/2004 | Moore et al. |
| 2006/0179037 | A1 |   | 8/2006 | Turner et al. |
| 2008/0263193 | A1 | * | 10/2008 | Chalemin et al. ............. 709/224 |

FOREIGN PATENT DOCUMENTS

| WO | WO 02/073471 | 9/2002 |
| WO | WO 2006/134526 | 12/2006 |

* cited by examiner

*Primary Examiner* — Baoquoc N To
(74) *Attorney, Agent, or Firm* — Ware, Fressola, Maguire & Barber LLP

(57) ABSTRACT

The invention relates to a method, a computer system, a computer readable medium and a document management system for repairing references of files. The computer system comprises a first location and a second location and one or more files stored in the first location. A command is received to transfer at least one file from the first location to the second location the at least one file referring to at least one other file. The at least one file and the at least one other file being referred to are transferred into the second location, and information on original locations of the transferred files is stored into the second location. After the transfer, one or more references appearing in the at least one file are automatically repaired by utilizing the information on the original locations of the transferred files.

29 Claims, 5 Drawing Sheets

METHOD, A COMPUTER SYSTEM, A COMPUTER READABLE MEDIUM AND A DOCUMENT MANAGEMENT SYSTEM FOR REPAIRING REFERENCES OF FILES

FIELD OF THE INVENTION

This invention relates generally to a document management system and especially to such a document management system that is a target for a file transfer, said file having references to other files. This invention relates to a solution for repairing references of such a file.

BACKGROUND OF THE INVENTION

Content management systems (CMS), document management systems (DMS) and data management systems refer to systems for managing electronic documents. In the present disclosure the term "document management system" is a general term referring also to content and data management systems. Such systems comprise various features for managing electronic documents, e.g. storing, versioning, indexing, searching for and retrieval of documents. It is appreciated that there are both dynamic and static document management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

An electronic document is media content in an electronic form that has been created and can be used by an electronic device. One of the benefits of electronic documents is that they can contain references to other electronic documents or to parts of other electronic documents. This means that an electronic document gives a possibility to lookup dynamically the content of other documents. For example a drawing of a house (host file) may refer to a floor plan (referenced file). The references may be absolute pathnames or relative pathnames. Absolute pathname contains information needed to locate a file with respect to the root directory (instead of the term "directory" also the term "folder" may be used). A relative pathname contains information necessary to locate a file with respect to the location of some other file. A reference containing a relative pathname specifies the location of the referenced file relative to the location of the host file. When a referenced file is located in the same directory as the host file, the reference contains the name of the referenced file. Often the name of the referenced file in the pathname is prefaced by the characters ".\", but this is not a requirement. Therefore if "drawing.dwg" and "floorplan.tif" were located in the same directory, the relative pathname in the reference would be ".\floorplan.tif" or "floorplan.tif". Naturally, relative pathnames may refer to a different directory, e.g. to a parent directory of a host file (i.e. "..\floorplan.tif") or to a subfolder, e.g. to a subfolder "scan" of a folder where the host file is located (that is, "scan\floorplan.tif" or ".\scan\floorplan.tif"). On the other hand an absolute pathname is a list of subdirectories into which one must descend to reach the referenced file, beginning with the root directory. If the file "floorplan.tif" is in a directory named "plans", which in turn is stored in C:\, the absolute pathname of the file "floorplan.tif" is then "C:\plans\floorplan.tif". Absolute pathnames may also lead to network drives. These paths are called UNC paths (Universal Naming Convention/Uniform Naming Convention), and are in the form of e.g. "\\server01\shareA\map2.dwg". FIG. 1 presents an example of a host file D0 that contains references to files D10, D20, D30, D40, D50. The purpose of FIG. 1 is to show examples of different pathnames (".\floorplan.tif", "maps\map.dwg", "..\logo.png", "C:\Plans\floorplan2.tif", "\\server01\shareA\map2.dwg") that can be used for referring. The skilled person will appreciate that the previously disclosed paths and forms of the pathnames are only examples of absolute and relative pathnames. The referenced files may also refer further to other files. Such a reference is called a nested reference. FIG. 1 comprises an example of a nested reference, where the host file D0 contains a reference to a file D40 ("map.dwg") that further contains a reference to an image file D45 ("cottage.tif") being located on "C:\Buildings\" directory.

The file references may exist between different types of files. As an example a Word file may refer to another Word file, to an Excel sheet and/or to an image file. As another example, an AutoCAD drawing may refer to another AutoCAD drawing and/or to an image file. The skilled person will appreciate that other reference combinations are possible as well.

In order to display the referenced files properly at the time the host file is opened, the references need to operate correctly. Each reference operates correctly only if the referenced file can be found by the absolute or the relative pathname. In other words, the absolute or relative locations need to be maintained, otherwise the references break down.

A problem relating to breakdown of references often occurs when file entities or single files are transferred from a hard disk or from a network to another location, e.g. into a document management system. The references may rupture when the absolute and/or relative locations of the files are changed. The problem is emphasized when files or file entities are transferred to a dynamic data management system, such as the M-Files® document management system of the applicant, where the files can be located in various dynamic directories. In a new system (i.e. target system, where the files are transferred to) the mutual relative location of the files is likely different than in their original location on the hard disk or in the network. In that case, an opening of a host file in a new system does not work completely because the opening application cannot find the referenced files any longer.

Some solutions of related art for preventing the aforementioned problem comprise transfer tools by means of which references can be remedied automatically either partly or completely before, during or soon after the files are transferred. This means that the transfer tools repair the references in connection with the transfer action. The transfer tool typically operates so that the files are opened one by one, and any references in each file are repaired by utilizing the information about the old and new locations of the files, which information is available to the transfer tool that transfers the files. By means of such a transfer tool, the whole data (i.e. the complete file entity) typically need to be transferred in one go, so that all the references will remain valid.

Other solutions of related art, on the other hand, may be based on a treelike structure that is duplicated (copied) in the document management system. In other words, a directory tree appearing on a hard disk is copied to the document management system. By means of such a solution, the relative references between files are maintained and such references do not need to be updated. However, e.g. dynamic document management systems aim to discard static file hierarchies whereby such a hierarchy is not desired to be duplicated. In such a dynamic system, the directory structure will be lost and the need for repairing relative references arises. Additionally, even though relative references between files remain valid by means of such a solution, the absolute references will typically break down.

One example of a method for maintaining integrity of links has been disclosed in U.S. Pat. No. 6,449,615. This solution comprises a link tracking service that is configured to track link source moves. For tracking the movement, the local link tracking service being located on the source computer (i.e. computer on which the link source is stored prior to the move) is initiated in response to the performance of a file move operation. If the link is moved to a new volume, the local link tracking service notifies a centralized link tracking service of the move. The centralized link tracking service maintains tables containing data of the location in the old volume and the data of the location in a new volume. The files are then updated by means of the link data stored in the local link tracking service or by means of data stored in the centralized link tracking service and the new path can be used. It is realized that this kind of solution uses an additional tool (i.e. link tracking service) for maintaining location tables. Therefore a simpler solution is appreciated.

SUMMARY OF THE INVENTION

The aim of the present invention is to enable the repairing of references in the files that are transferred from an old system to a new system as a separate operation after the actual file transfer operation, in other words without requiring that the repairing of references is performed in connection with the file transfer operation. Another aim of the present invention is to provide a solution that is simpler compared to solutions of related art and that can be used in dynamic document management systems.

These aims are achieved by a method, a computer system, a computer readable medium and a document management system.

The method according to one example of the invention for a computer system having a first location and a second location and one or more files stored in said first location, comprises receiving a command to transfer at least one file from the first location to the second location, said at least one file referring to at least one other file; transferring said at least one file and said at least one other file being referred to into the second location, and storing information on original locations of said transferred files to the second location, and after the transfer; automatically repairing one or more references appearing in said at least one file by utilizing the information on the original locations of the transferred files.

The computer system according to one example of the invention comprises a first location and a second location, and one or more files stored in said first location. Said computer system further comprises a receiver (receiving means) configured to receive a command to transfer at least one file from the first location to the second location, said at least one file referring to at least one other file, wherein as a response to said command, said computer system is configured to transfer said at least one file and said at least one other file being referred to into the second location, and to store information on original locations of said transferred files to the second location, after which the system is configured to automatically repair one or more references appearing in said at least one file by utilizing the information on the original locations of the transferred files.

The computer readable medium according to one example of the invention comprises computer program instructions stored thereon (the computer readable medium thus is nontransitory), wherein said instructions when executed are for receiving a command to transfer of at least one file from a first location to a second location, said at least one file referring to at least one other file; transferring said at least one file and said at least one other file being referred to into the second location, and storing information on original locations of said transferred files to the second location, and after the transfer; automatically repairing one or more references appearing in said at least one file by utilizing the information on the original locations of the transferred files.

The document management system according to the invention comprises a receiver (receiving means) configured to receive a notification of an intended transfer of at least one file from a first location to the said document management system, said at least one file referring to at least one other file; wherein as a response to said notification, said document management system is configured to receive said at least one file and said at least one other file being referred to, and to store information on the original locations of said transferred files; wherein said document management system comprises means configured to automatically repair references appearing in said at least one file by utilizing the information on the original locations of the transferred files.

According to another example of the invention, the references may be automatically repaired at the time the file is opened. According to one other example the file may be delivered to a repairing program for repairing the references.

According to yet another example of the invention, the files to be transferred may be transferred within the same transfer operation. The files may be also transferred as separate transfer operations.

According to yet another example of the invention, the information relating to the original locations of the transferred files is stored into metadata of said transferred files. The information on the original locations may also by stored to a list in the second location.

According to yet another example of the invention, the first location in the computer system may be a hard disk or a network drive and the second location is a document management system. The document management system may comprise virtual folders for showing the files, which makes the document management system a dynamic system.

According to yet another example of the invention, said at least one other file being referred to is located in a location different from the first location before the transfer.

The present solution is very useful with respect to dynamical document management systems, but it is appreciated that the solution may be utilized by other document management systems as well. However dynamical document management systems, as said, abandon the traditional static data hierarchies, and exploit dynamic data hierarchy where files are shown in one or more virtual folder hierarchies. This kind of system offers new challenges because the traditional data hierarchies are lost and therefore also the references may break down.

In addition, by the present solution, the files can be transferred one by one or all at once, or anything between these two extremes. However, in any situation, the references will be correct after the automatic repairing process according to the invention has been performed.

In the solutions of related art, the repairing process occurs in connection to the transfer (either before, during or soon after transfer). This means that the transfer and the repairing process form a single, combined operation. However, by means of the present solution, in addition to the actual transfer, also information on the original locations is stored to the new system. This makes it possible to remedy references even later (e.g. after a long time) as an independent operation. In the prior solutions, the repairing needs to take place together with the transfer in order to keep the track of the original locations, because these transfer tools do not store data on the original locations for the purpose of repairing references later as an independent operation.

In addition, by means of the present invention, also nested references will be correctly repaired. Because information concerning the original location of the files to be transferred is stored, also corresponding information of files acting as nested references will be stored.

DESCRIPTION OF THE DRAWINGS

The invention is described in more detailed manner by means of the following disclosure and the drawings, where.

DETAILED DESCRIPTION OF THE INVENTION

Before describing the invention in more detailed manner, a few terms are defined in order to ease the reading and understanding of the invention. "File" in this disclosure relates to a medium that has been created by a certain application. For example, a piece of text created by using the Microsoft Word application and saved on the "C:\" drive is a file. Similarly, a drawing created by using the AutoCAD application represents a file. Such an electronic file may contain one or more references to one or more other files respectively, and they can be displayed by an electronic device. In the context of document management system, the file becomes a "document" after metadata is associated with it. "Metadata" refers to information on a document's properties. For example, a creator of the file or a creation date may represent content of the metadata. "Document management system" is used for describing both "document management systems" as such, but also "content management systems" or "data management systems". "Host file" refers to a document/file that contains references to one or more other documents/files. The document/file that is referred to is called "referenced file". "New location" or "new system" refers to a target document management system, where files are transferred to. "Target application" or "opening application" refers to an application that is capable of reading certain files/documents. Examples of applications are AutoCAD®, Microsoft Office™, CorelDRAW!® etc.

Figure 1:
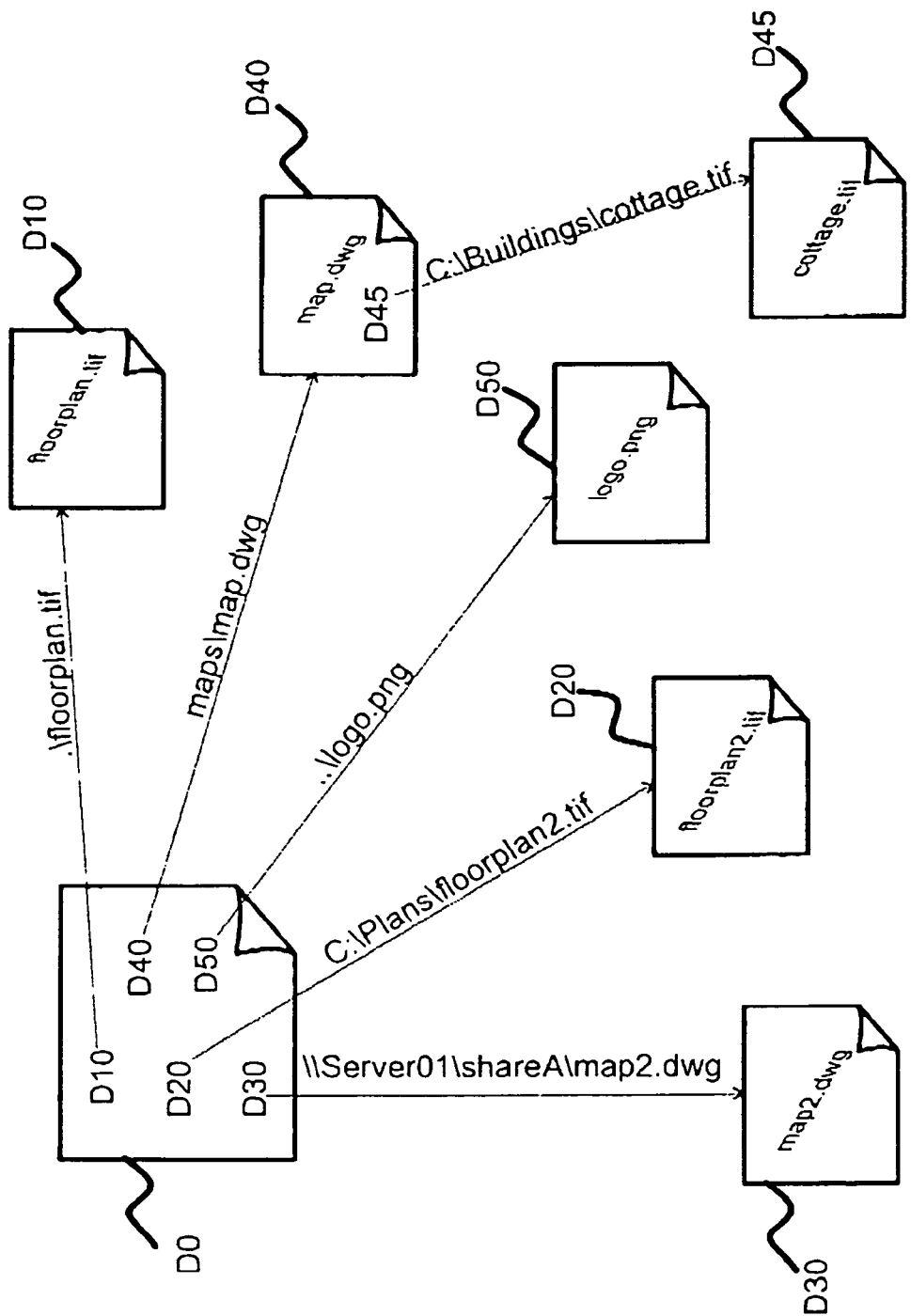
FIG. 1 illustrates an example of a host file referring to other files.
Figure 2:
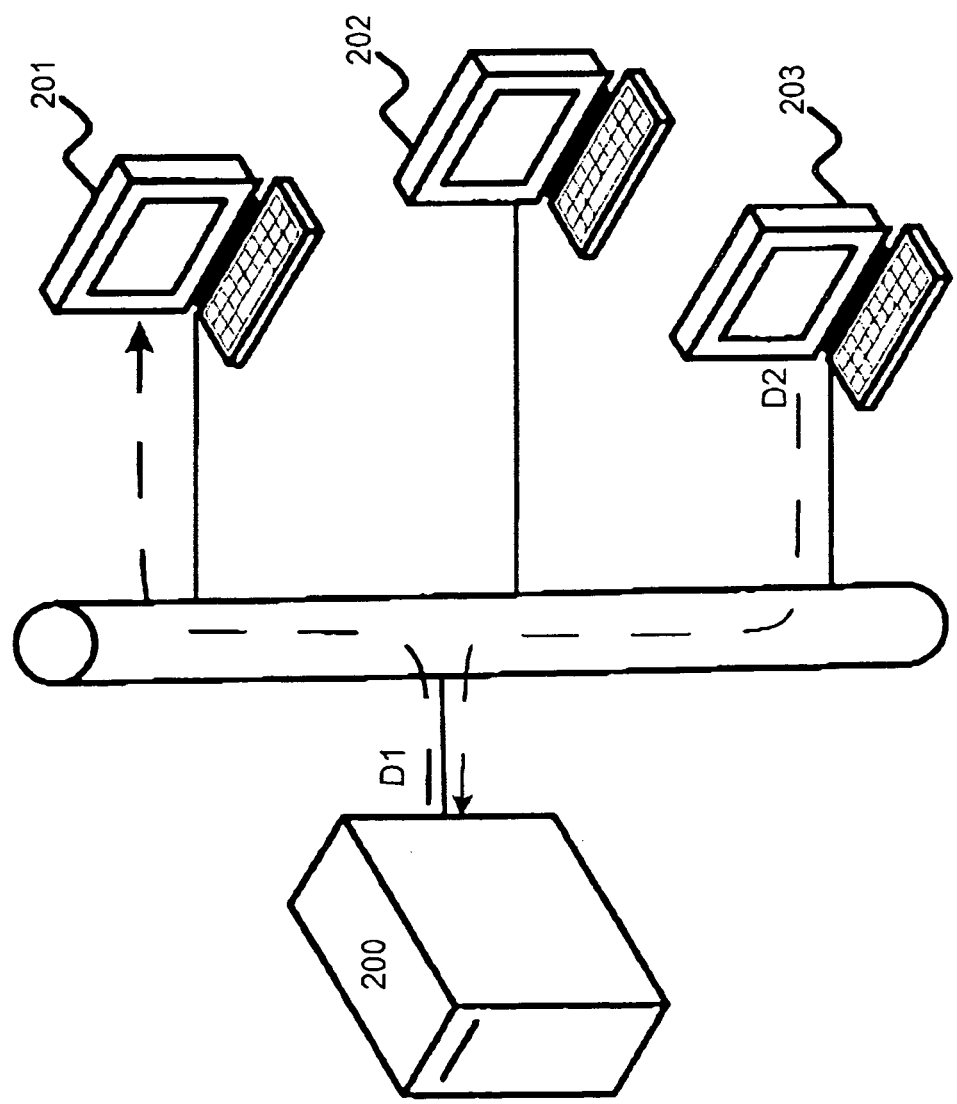
FIG. 2 illustrates an example of a document management system.

FIG. 2 illustrates an example configuration of a document management system. The document management system comprises the document management server 200 and client devices 201, 202, 203, which are all interconnected. The interconnection can be wired or wireless and it may be substantially always on or it may be disconnected occasionally. The server 200 is configured to store documents that can be retrieved by the client devices 201, 202, 203. For example, in FIG. 2 document D1 is retrieved by client device 201, whereas document D2 is stored by the client device 203 to the document management server 200. The document management server 200 is configured mainly to store documents, but in use the document management server may have other functions as well, e.g. it controls access rights, registers modifications made to documents and allows connections to other systems.

Figure 3:
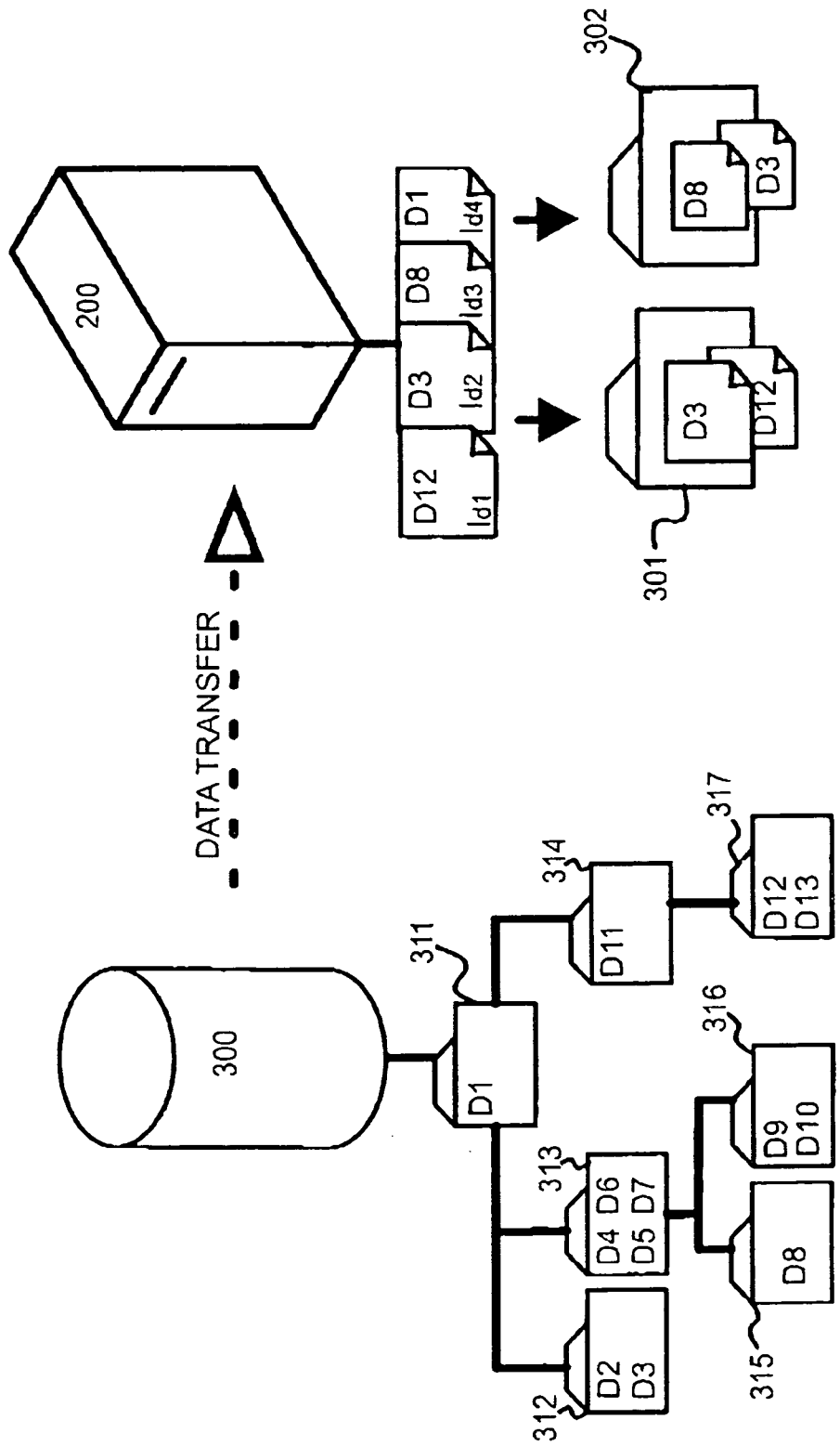
FIGS. 3a and 3b illustrate an example of transfer of files to a document management system.

FIGS. 3a and 3b illustrate a simplified example of a data transfer process. Hard disk 300 of FIG. 3a stores folders (311-317) in a treelike manner. Folders contain electronic files D1-D13 that may have references to each other. Lines between folders 311-317 illustrate paths. When one or more files within folders are transferred to a document management server 200, the treelike hierarchy is destroyed as illustrated by FIG. 3b. Files are associated with metadata and given identifications Id1-Id4. The documents in the document management server 200 are located in virtual folders 301, 302 into which the documents are grouped on the basis of the metadata of each document. The metadata thus determines the location of the document in the various virtual folders. Due to the dynamic nature of the document management system, files/documents may be displayed in more than one virtual folders or in none. For example, in FIG. 3b the document D3 is displayed in both virtual folders 301, 302, but the document D1 is not displayed at all. The visibility of the documents is determined according to the situation where the user is working and with which documents the user is working with.

Figure 4:
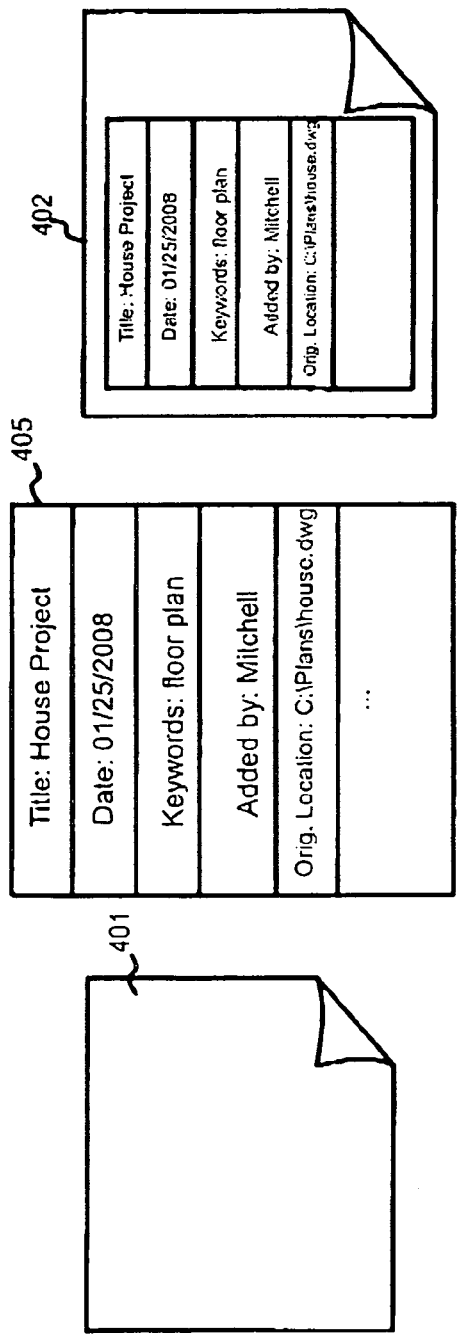
FIG. 4 illustrates an example of metadata for a file.

During file transfer process from the hard disk 300 to the document management server 200 an information on the location wherefrom each of the files to be transferred originates is automatically stored alongside with said file. Alongside here means that the information can be stored e.g. to the metadata of the document/file in a new system. The information may also be stored to some other suitable place in a new system, e.g. to a list containing identifications and original locations of the transferred files. FIG. 4 illustrates an example of file 401 for which metadata 405 is associated. The metadata comprises e.g. a title of the file, a creation date, keywords, a name of the creator and an original location. In this disclosure, when a file 401 is associated with metadata, it becomes a document 402.

In the previous example, a hard disk is used as a source storage for files. However, it is appreciated that hard disk is not the only option, but the files can be originated e.g. from a network drive as well. Also in that case the file transfer and reference repairing method of the present invention can be utilized.

What should be noticed is that during or in connection with the file transfer process, there is no need to remedy the references in the files (as in the solutions of related art). Because of this, there is no need to transfer or process all the files being dependent on each other at once. In addition, the users or the applications available to the users do not necessarily need to be able to read or modify the data of the files to be transferred during the transfer process. Users can therefore transfer files from the old system to the new one little by little without taking file entities into consideration and without having access to applications that can interpret the file formats of the transferred files. In connection with the file transfer, the document management system automatically stores information on the original location (in the old system) of the files being transferred (e.g. C:\Plans\floorplan.tif) into the new system, e.g. to the metadata of the documents or in some other suitable place.

The document management system according to the invention may also comprise an auxiliary computer element (add-in/add-on/plug-in or similar) that operates together with the opening application. This auxiliary element may repair the references in the file at the time the file is opened by the application from the new system. For example: The files "drawing.dwg", "map.dwg", and "logo.tif" have been transferred to a new system. The file "drawing.dwg" is a host file that contains unrepaired references to the files "map.dwg" and "logo.tif". The original locations (in the old system) of these example files are "C:\Drawings\drawing.dwg", "C:\Maps\map.dwg", and "\\server01\logos\logo.tif", respectively, and information on these original locations (in the old system) have been automatically stored in the new system during the file transfer operations. The file "drawing.dwg" is opened by AutoCAD from the new system, due to which the auxiliary computer element is configured to remedy the references appearing in "drawing.dwg". The host file "drawing.dwg" refers to the file "map.dwg" by using a relative pathname (..\Maps\map.dwg) and to the file "logo.tif" by using an absolute pathname (\\server01\logos\logo.tif). The auxiliary computer element is capable of utilizing the information on the original location of the host file (in the old system) that was stored into the new system during the file transfer operation, and can thus form information on the original location of the referenced files in the old system, even if the references are relative pathnames. In the previous example, the auxiliary computer element is therefore capable of determining that the original location (in the old system) of the file "map.dwg" referred to by the relative pathname "..\Maps\map.dwg" is "C:\Maps\map.dwg". After the auxiliary computer element has determined which are the original locations (in the old system) of the referenced files, it may look for the files from the new system based on this information and repair the references to refer to the new locations of these files in the new system.

Figure 5:
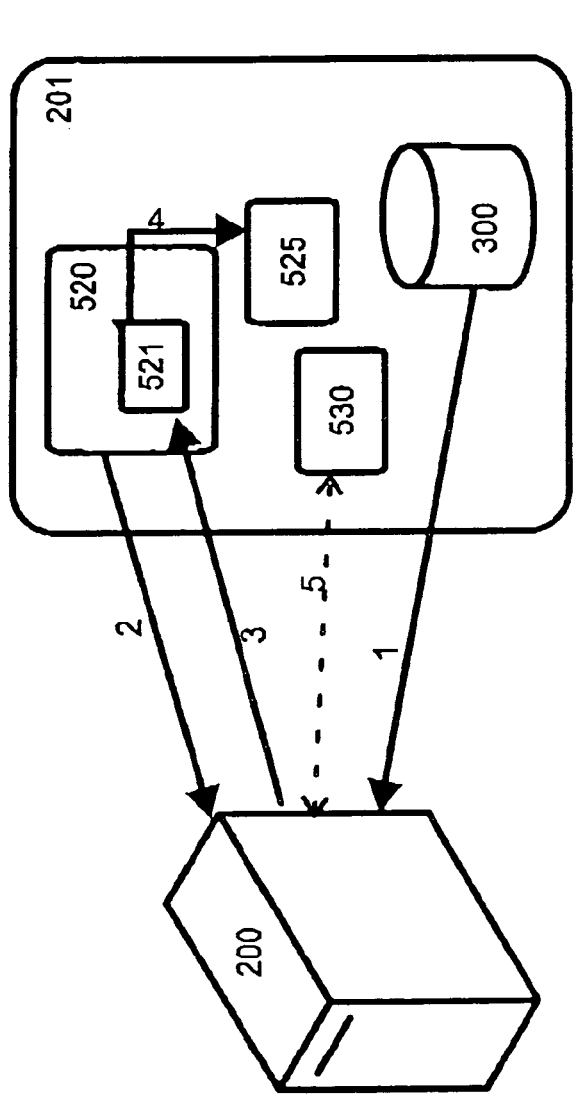
FIG. 5 illustrates an example of a computer system.
Figure 6:
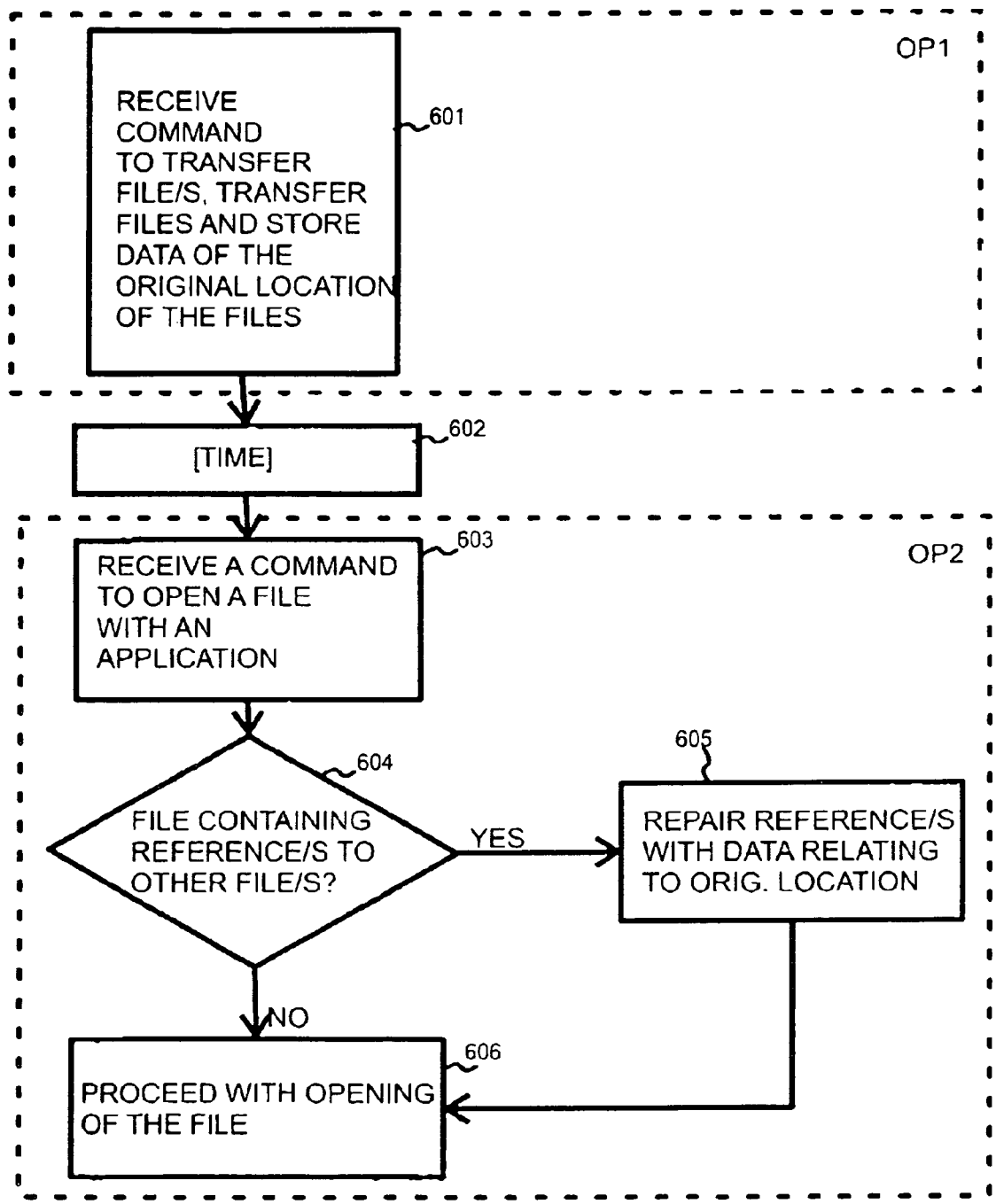
FIG. 6 illustrates an example of method steps for the present solution.

FIG. 5 illustrates an example of a computer system, comprising a document management server 200 and a client device 201. In this example, a hard disk 300 is for the client device 201, and from said hard disk 300, files are transferred (1) to the document management server 200 according to the present invention. After the files have been transferred to the document management server 200, they can be opened (2) by an application 520. The application 520 receives (3) a file to be opened, and a plug-in manager 521 or similar calls for an auxiliary element 525. This auxiliary element 525 is configured to repair references in the file before the application 520 actually opens the file, during the opening of the file, or immediately after the opening of the file, with the end result that for the user of the application 520, the references are working properly and the application 520 is capable of accessing the referenced files in the new system by using the repaired references. According to another example of the invention, the repairing of references is performed by a repairing program. In FIG. 5, such a repairing program 530 is illustrated. The document management server 200 may deliver (5) the files to be repaired to the repairing program 530, which returns the files back to the server 200 after the repairing. In FIG. 5 the repairing program 530 and the auxiliary element 525 are illustrated to be located in the client device 201. However, it is possible that the repairing program 530 and the auxiliary element 525 is located in the document management server 200 as well. Similarly, it is possible to have either the auxiliary element 525 or the repairing program 530 in the computer system, but it is also possible that the computer system comprises both of them. FIG. 6 is provided for presenting the method steps by a simplified flow chart:

a command to transfer one or more files is received, whereupon said files are transferred and in connection with the transfer procedure, information relating to the original location of said files is stored (601)

a command to open a file with an application is received (603), due to which it is checked whether the file contains any references to other files (604)

if not, the opening is proceeded with (606)

if so, the references are repaired (605) and the opening is proceeded with (606).

FIG. 6 shows that the method is separated into two different operations OP1 and OP2. The transfer procedure with storing the original location of files (601) is performed as the first operation OP1 and acts for repairing the references (603-606) (in this example in connection with the opening the application) are performed as the second operation OP2. What should be noticed, is that time may pass between these two operations. It is not essential what is the length of the time therein between, but that the operations OP1 and OP2 are independent operations.

It is appreciated that one or more files can be transferred to a document management system without having references repaired, whereas in the solutions of related art, the references are repaired in connection with the transfer operation, unless the file hierarchy of the old system is duplicated in the new system in which case no repairing is needed for relative references. The references are repaired in the present invention at the time the file is opened, as on the fly, or as a batch operation in the new system, but in any case without the need to perform the repairing of the references in connection with the file transfer operation. In other words, in the present invention, the transfer of files and the subsequent repairing of references are separated to two independent operations, and even a long time can pass between these two operations, whereas in the solutions of related art, the file transfer and the repairing of references form a single, combined operation. As described above, the repairing can be implemented by an auxiliary computer element, but the repairing can be implemented also by a separate tool (repairing program) that is located in a new system. In this manner file entities can be opened in the new document management system so that referenced files can be found automatically from the new system, and the file entity (e.g. host drawing and the referenced image file) can be opened completely correctly. Separate file transfer tool is therefore not needed. For system users, the references are repaired automatically and no user actions are needed.

It is appreciated that by the present solution, the files may be transferred by using a different device than the one that repairs the references afterwards. This differs from the solutions of related art, where transfer of files and repairing of references form an entity that needs to be processed as an entity by using the same device. The present invention, thus makes it possible that one user can perform the transfer operation whereas another user may perform the operation that automatically repairs the references.

The foregoing detailed description discloses the present invention by means of an example. The skilled person will appreciate that the detailed description has been given for better understanding of the invention, and some of the features (e.g. system configuration) may vary depending on the possible other functionalities that are incorporated with the document management system.

What is claimed is:

1. A method for a computer system, said method comprising transferring at least two files to a target location from their respective original locations, where one of said at least two files is a referring file and one of said at least two files is a referred-to file, wherein the referring file comprises a reference to the referred-to file, which reference comprises information on the original location of said referred-to file;

associating each of said transferred files in the target location with the information on the original location of the file;

automatically repairing said reference in said referring file by determining the location of said referred-to file in the target location by utilizing at least the information on the original location of said referred-to file, which information was stored in the target location in connection with said transfer of the referred-to file and associated with said referred-to file in the target location.

2. The method according to claim 1, comprising opening a referring file by an application during which the reference is automatically repaired.

3. The method according to claim 1, comprising delivering said referring file to a repairing program for repairing the reference.

4. The method according to claim 1, wherein said referring file and said referred-to file are transferred within the same transfer operation.

5. The method according to claim 1, wherein said referring file and said referred-to file are transferred as separate transfer operations.

6. The method according to claim 1, wherein the information relating to the original locations of the transferred files is stored into metadata of said transferred files in the target location.

7. The method according to claim 1, wherein the information relating to the original locations of the transferred files is stored in a list in the target location.

8. The method according to claim 1, wherein the transfer of the files and the repairing of references are performed as independent operations.

9. The method according to claim 1, wherein the original location is a hard disk or a network drive.

10. The method according to claim 1, wherein the target location is a document management system.

11. The method according to claim 10, wherein the document management system comprises virtual folders for showing files.

12. The method according to claim 1, wherein said referred-to file is located, before the transfer, in a location different from the location of the referring file.

13. A computer system, comprising a processor configured to transfer at least two files to a target location from their respective original locations, where one of said at least two files is a referring file and one of said at least two files is a referred-to file, wherein the referring file comprises a reference to the referred-to file, which reference comprises information on the original location of said referred-to file;

associate each of said transferred files in the target location with the information on the original location of the file;

automatically repair said reference in said referring file by determining the location of said referred-to file in the target location by utilizing at least the information on the original location of said referred-to file, which information was stored in the target location in connection with said transfer of the referred-to file and associated with said referred-to file in the target location.

14. The computer system according to claim 13, comprising an auxiliary element operating with an opening application, said opening application being configured to open the referring file, in connection to which the auxiliary element is configured to repair the reference automatically.

15. The computer system according to claim 13, comprising a repairing program being configured to repair the reference when executed by a processor.

16. The computer system according to claim 13, being configured to store the information on the original locations of the transferred files into metadata of said transferred files in the target location.

17. The computer system according to claim 13, being configured to store the information on the original locations of the transferred files to a list in the target location.

18. The system according to claim 13, wherein the original location is a hard disk or a network drive.

19. The system according to claim 13, wherein the target location is a document management system.

20. The system according to claim 19, wherein the document management system comprises virtual folders for showing files.

21. The system according to claim 13, wherein said referred-to file is located, before the transfer, in a location different from the location of the referring file.

22. A non-transitory computer readable medium comprising computer program instructions stored thereon, wherein said instructions when executed are for transferring at least two files to a target location from their respective original locations, where one of said at least two files is a referring file and one of said at least two files is a referred-to file, wherein the referring file comprises a reference to the referred-to file, which reference comprises information on the original location of said referred-to file;

associating each of said transferred files in the target location with the information on the original location of the file;

automatically repairing said reference in said referring file by determining the location of said referred-to file in the target location by utilizing at least the information on the original location of said referred-to file, which information was stored in the target location in connection with said transfer of the referred-to file and associated with said referred-to file in the target location.

23. A document management system comprising a document management server configured to transfer at least two files to a target location from their respective original locations, where one of said at least two files is a referring file and one of said at least two files is a referred-to file, wherein the referring file comprises a reference to the referred-to file, which reference comprises information on the original location of said referred-to file;

associate each of said transferred files in the target location with the information on the original location of the file;

automatically repair said reference in said referring file by determining the location of said referred-to file in the target location by utilizing at least the information on the original location of said referred-to file, which information was stored in the target location in connection with said transfer of the referred-to file and associated with said referred-to file in the target location.

24. The document management system according to claim 23, comprising an auxiliary element operating with an opening application, said opening application being configured to open the referring file, in connection to which the auxiliary element is configured to repair the reference automatically.

25. The document management system according to claim 23, being configured to store the information on the original locations of the transferred files into metadata of said transferred files.

26. The document management system according to claim 23, being configured to store the information on the original locations of the transferred files to a list in said document management system.

27. The document management system according to claim 23, comprising virtual folders for showing files.

28. The method according to claim 1, wherein as a result of said repair, a reference from said referring file to the said referred-to file is maintained.

29. The computer readable medium according to claim 22 wherein as a result of said repair, a reference from said referring file to said referred-to file is maintained.

* * * * *